United States Patent
Chaudhury et al.

(10) Patent No.: US 12,378,643 B2
(45) Date of Patent: *Aug. 5, 2025

(54) ALUMINUM ALLOYS

(71) Applicant: DIVERGENT TECHNOLOGIES, INC., Los Angeles, CA (US)

(72) Inventors: Prabir Kanti Chaudhury, Los Angeles, CA (US); Chan Cheong Pun, Los Angeles, CA (US); Chor Yen Yap, Los Angeles, CA (US); Taiki Thomas Shirai, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 525 days.

This patent is subject to a terminal disclaimer.

(21) Appl. No.: 16/526,691

(22) Filed: Jul. 30, 2019

(65) Prior Publication Data
US 2020/0232071 A1 Jul. 23, 2020

Related U.S. Application Data

(60) Provisional application No. 62/794,509, filed on Jan. 18, 2019.

(51) Int. Cl.
| | |
|---|---|
| *C22C 21/08* | (2006.01) |
| *B23K 26/34* | (2014.01) |
| *B33Y 70/00* | (2020.01) |
| *B33Y 30/00* | (2015.01) |

(52) U.S. Cl.
CPC .............. *C22C 21/08* (2013.01); *B23K 26/34* (2013.01); *B33Y 70/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 2,784,126 A | 3/1957 | Criner |
| 3,879,194 A | 4/1975 | Morris et al. |
| 3,958,987 A | 5/1976 | Chia et al. |
| 4,021,271 A | 5/1977 | Roberts |
| 4,049,474 A | 9/1977 | Zakharov et al. |

(Continued)

FOREIGN PATENT DOCUMENTS

| | | |
|---|---|---|
| CN | 101233252 A | 8/2005 |
| CN | 102312135 A | 1/2012 |

(Continued)

OTHER PUBLICATIONS

US 9,202,136 B2, 12/2015, Schmidt et al. (withdrawn)

(Continued)

*Primary Examiner* — Jiangtian Xu
(74) *Attorney, Agent, or Firm* — ArentFox Schiff, LLP

(57) ABSTRACT

According to some configurations of the present disclosure, an alloy may include a composition that includes magnesium (Mg) that is approximately 5 to 12% by weight of the composition; manganese (Mn) that is approximately 0.1 to 2% by weight of the composition; and silicon (Si) that is approximately 0.3 to 3% by weight of the composition; and aluminum (Al) that is a balance of the composition. In one configuration, the composition may further include one or more of iron (Fe), titanium (Ti), zirconium (Zr), chromium (Cr), and/or yttrium (Y).

39 Claims, 5 Drawing Sheets

(56) References Cited

U.S. PATENT DOCUMENTS

| | | |
|---|---|---|
| 4,531,977 A | 7/1985 | Mishima et al. |
| 4,828,008 A | 5/1989 | White et al. |
| 4,869,870 A | 9/1989 | Rioja et al. |
| 4,929,421 A | 5/1990 | Jin |
| 4,973,522 A | 11/1990 | Jordan et al. |
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,306,342 B2 | 10/2001 | Koch |
| 6,318,642 B1 | 11/2001 | Goenka et al. |
| 6,342,112 B1 | 1/2002 | Barlat et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,908,516 B2 | 6/2005 | Hehmann et al. |
| 6,919,035 B1 | 7/2005 | Clough |
| 6,926,755 B2 | 8/2005 | Shamblen et al. |
| 6,926,970 B2 | 8/2005 | James et al. |
| 6,955,785 B2 | 10/2005 | Saga et al. |
| 7,152,292 B2 | 12/2006 | Hohmann et al. |
| 7,177,384 B2 | 2/2007 | Murakami et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,713,470 B2 | 5/2010 | Toyoda et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,039,848 B2 | 5/2015 | Norman |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |

(56) References Cited

U.S. PATENT DOCUMENTS

| | | |
|---|---|---|
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 10,016,582 B2 | 1/2018 | Broda |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,072,322 B2 | 9/2018 | Park |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |

(56) References Cited

U.S. PATENT DOCUMENTS

| | | | |
|---|---|---|---|
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 10,472,707 B2 | 11/2019 | Benedictus | |
| 11,302,457 B2 | 4/2022 | Kusakari | |
| 11,410,787 B2 | 8/2022 | Araki et al. | |
| 2002/0000270 A1 | 1/2002 | Doko et al. | |
| 2002/0088512 A1 | 7/2002 | Kitaoka | |
| 2002/0102179 A1 | 8/2002 | Murai et al. | |
| 2005/0271543 A1 | 12/2005 | Pfannen-Mueller et al. | |
| 2006/0108783 A1 | 5/2006 | Ni et al. | |
| 2006/0169371 A1 | 8/2006 | Cosse et al. | |
| 2007/0000583 A1 | 1/2007 | Rioja et al. | |
| 2008/0175750 A1* | 7/2008 | Li | B22F 3/26 420/590 |
| 2008/0193322 A1 | 8/2008 | Gibson et al. | |
| 2010/0054985 A1 | 3/2010 | Dieringa et al. | |
| 2010/0059485 A1 | 3/2010 | Hutchison et al. | |
| 2010/0180989 A1 | 7/2010 | Ahmed et al. | |
| 2011/0259479 A1 | 10/2011 | Telioui et al. | |
| 2012/0000578 A1 | 1/2012 | Wang et al. | |
| 2013/0146186 A1 | 6/2013 | Telioui et al. | |
| 2013/0240095 A1 | 9/2013 | Pandey | |
| 2014/0277669 A1 | 9/2014 | Nardi et al. | |
| 2017/0069403 A1 | 3/2017 | Yoshida et al. | |
| 2017/0113344 A1 | 4/2017 | Schönberg | |
| 2017/0121802 A1 | 5/2017 | Kamat et al. | |
| 2017/0165795 A1 | 6/2017 | Lenczowski | |
| 2017/0182595 A1 | 6/2017 | Nelson | |
| 2017/0198152 A1 | 7/2017 | Blumenau et al. | |
| 2017/0341309 A1 | 11/2017 | Piepenbrock et al. | |
| 2018/0010215 A1 | 1/2018 | Sanaty-Zedah et al. | |
| 2018/0214949 A1 | 8/2018 | Martin et al. | |
| 2018/0298478 A1 | 10/2018 | Shih et al. | |
| 2019/0161836 A1 | 5/2019 | Martin et al. | |
| 2019/0169717 A1 | 6/2019 | Li et al. | |
| 2019/0249285 A1 | 8/2019 | Bes et al. | |
| 2019/0271061 A1 | 9/2019 | Tang et al. | |
| 2019/0368008 A1 | 12/2019 | Araki et al. | |
| 2020/0063242 A1 | 2/2020 | Valls Angles | |
| 2020/0232070 A1* | 7/2020 | Pun | B23K 26/34 |
| 2020/0232071 A1 | 7/2020 | Chaudhury et al. | |
| 2020/0276638 A1 | 9/2020 | King et al. | |
| 2022/0161353 A1 | 5/2022 | Zrodowski | |
| 2022/0195561 A1 | 6/2022 | Pun et al. | |
| 2022/0220587 A1 | 7/2022 | Pun | |
| 2022/0220589 A1 | 7/2022 | Pun | |
| 2022/0305554 A1 | 9/2022 | Bielecki et al. | |
| 2023/0011781 A1 | 1/2023 | Pun et al. | |
| 2023/0235429 A1 | 7/2023 | Chaudhury et al. | |
| 2024/0227009 A9 | 7/2024 | Pun et al. | |
| 2024/0227011 A9 | 7/2024 | Li et al. | |

FOREIGN PATENT DOCUMENTS

| | | |
|---|---|---|
| CN | 105177368 A | 12/2014 |
| CN | 104561677 A | 4/2015 |
| CN | 106574329 A | 4/2017 |
| CN | 107299260 A | 10/2017 |
| CN | 108380865 A | 8/2018 |
| CN | 108796320 A | 11/2018 |
| CN | 108884520 A | 11/2018 |
| CN | 109175350 A | 1/2019 |
| CN | 110181193 A | 8/2019 |
| EP | 1917373 A2 | 5/2008 |
| EP | 3137639 B1 | 1/2020 |
| FR | 3065178 A1 | 10/2018 |
| FR | 3066129 A1 | 11/2018 |
| GB | 595929 A | 12/1947 |
| JP | 05-179384 H | 7/1993 |
| JP | 10226839 H | 8/1998 |
| JP | H10226839 A | 8/1998 |
| JP | 2001131670 A | 5/2001 |
| JP | 2003268476 A | 9/2003 |
| JP | 2003-268476 A1 | 3/2004 |
| JP | 2005139537 A | 6/2005 |
| JP | 2005139538 A | 6/2005 |
| JP | 2007-092117 A | 4/2007 |
| JP | 2008179838 A | 8/2008 |
| JP | 2015052131 A | 3/2015 |
| JP | 5985165 B2 | 9/2016 |
| JP | 2018-184659 A | 11/2018 |
| JP | 2019-160361 A | 9/2019 |
| KR | 20210113640 A | 9/2021 |
| RU | 2661525 C1 | 7/2018 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004106570 A1 | 12/2004 |
| WO | 2004108343 A1 | 12/2004 |
| WO | 2005093773 A1 | 10/2005 |
| WO | 2007003375 A1 | 1/2007 |
| WO | 2007020041 A1 | 2/2007 |
| WO | 2007020041 A2 | 2/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |

(56) References Cited

FOREIGN PATENT DOCUMENTS

| | | |
|---|---|---|
| WO | 2009036953 A1 | 3/2009 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2013144343 A1 | 10/2013 |
| WO | 2014016437 A1 | 1/2014 |
| WO | 2014114625 A1 | 7/2014 |
| WO | 2014187720 A1 | 11/2014 |
| WO | 2014195340 A1 | 12/2014 |
| WO | 2015193331 A1 | 12/2015 |
| WO | 2016032758 A1 | 3/2016 |
| WO | 2016116414 A1 | 7/2016 |
| WO | 2016145397 A1 | 9/2016 |
| WO | 2017036461 A1 | 3/2017 |
| WO | 2017077137 A2 | 5/2017 |
| WO | 2018155531 A1 | 8/2018 |
| WO | 2018/185259 A1 | 10/2018 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2019/092641 A1 | 5/2019 |
| WO | 2019109135 A1 | 6/2019 |
| WO | 2019155180 A1 | 8/2019 |
| WO | 2019161137 A1 | 8/2019 |
| WO | 2020058646 A1 | 3/2020 |
| WO | 2020150055 A1 | 7/2020 |
| WO | 2020220143 A1 | 11/2020 |

OTHER PUBLICATIONS

US 9,809,265 B2, 11/2017, Kinjo (withdrawn)
US 10,449,880 B2, 10/2019, Mizobata et al. (withdrawn)
Cen ("Aluminium and aluminium alloys—Chemical composition and form of wrought products—Part 3: Chemical composition and form of products", 2007). (Year: 2007).*
International Search Report & Written Opinion received in PCT/US2020/012726 dated Apr. 2, 2020.
International Search Report & Written Opinion received in PCT/US2020/012733 dated Apr. 2, 2020.
Atlas Steels "Aluminum Alloy Data Sheet 5083", Oct. 2013, www.atlassteels.com.au.
Chinese version of the Notification of the First Office Action issued for corresponding Chinese Patent Application No. 202080018077.5, Mar. 9, 2022.
English language translation of the Notification of the First Office Action issued for corresponding Chinese Patent Application No. 202080018077.5, Mar. 9, 2022, 10 pages.
Chinese version of the Notification of the First Office Action issued for corresponding Chinese Patent Application No. 202080016939.0, Mar. 18, 2022.
English language translation of the Notification of the First Office Action issued for corresponding Chinese Patent Application No. 202080016939.0, Mar. 18, 2022.
English abstract for Chinese Published Application No. 107299260.
Channel Change et al., "3D Printing and Invader," WARA Scientific University Press, Nov. 2017, pp. 7.
Extended European Search Report in EP20741841.9, mailed Sep. 14, 2022, 7 pages.
Office action in CN 202080018077.5, mailed Aug. 10, 2022, 6 pages.
Extended European Search Report in EP20741246.1, mailed Oct. 24, 2022, 7 pages.
Second Office action in CN 202080016939.0, mailed Aug. 10, 2022, 6 pages.
Senchang Chen, "3D Print and Maker", Ed. p. 7, Huazhong University of Science and Technology Press Co., Ltd., Nov. 30, 2017.
Chinese version of the Notification of the Second Office Action issued in corresponding CN Application No. 202080018077.5, Aug. 10, 2022.
English language translation of the the Second Office Action issued in corresponding CN Application No. 202080018077.5, Aug. 10, 2022.
Senchang Chen Ed., "3D Print and Maker", p. 7, Huazhong University of Science and Technology Press Co., Ltd., Nov. 30, 2017.
Supplementary European Search Report issued in corresponding European Application No. 20741841.9, Sep. 14, 2022.
Dalmoro, "Droplet size prediction in the production of drug delivery microsystems by ultrasonic atomization," Translational Medicine @ UniSa, 2013, vol. 7, No. 2, pp. 6-11.
International Search Report and Written Opinion in PCT/US2021/064742, mailed Mar. 9, 2022, 6 pages.
International Search Report and Written Opinion in PCT/US2021/064748, mailed Mar. 7, 2022, 6 pages.
International Search Report and Written Opinion in PCT/US2022/036020, mailed Sep. 27, 2022, 6 pages.
Invitation to Pay Additional Fees in PCT/US2023/077455, mailed Jan. 11, 2024, 3 pages.
International Search Report and Written Opinion in PCT/US2023/061311, mailed May 1, 2023, 7 pages.
Rajan et al., "Correlations to predict droplet size in ultrasonic atomization," Ultrasonics, 2001, vol. 39, pp. 235-255.
International Search Report and the Written Opinion received for International Application No. PCT/US21/64732, Mar. 17, 2022.
G. Brodova et. al.,"Effect of Rapid Hardening of Melt, Annealing, and Severe Plastic Deformation on Formation of Scandium and Zirconium Aluminides in Al—Mg—Mn Alloys", Metal Science and Heat Treatment vol. 50, Nos. 9-10, 2008.
S.P.Wen, et. al, "The effect of erbium on the microstructure and mechanical properties of Al—Mg—Mn—Zr alloy", Materials Science and Engineering, A 516, 42-49, 2009.
Office Action in IN202117037227, mailed Nov. 18, 2022, 7 pages.
Gulyaev, A.P., Metal Science, M., Metallurgy, 1986, pp. 88-89.
Kumanin V.I., Current Metallurgical Dictionary, Basic Terms, Russian language, 1989, p. 328.
Kuznetsov, S.A., Big Explanatory Dictionary of the Russian Language, 1998, Norint, St. Petersburg, p. 1249.
Office Action in RU2021124350, mailed Sep. 26, 2023, 8 pages.
Sergey Dobatkin et al., "Improvement in the strength and ductility of Al—Mg—Mn alloys with Zr and Sc additions by equal channel angular pressing", Baikov Institute of Metallurgy and Materials Science, Russian Academy of Sciences, Moscow, Russia, International Journal of Materials Research downloaded from [www.hanser-elibrary.com] by Uppsala Universitetsbibliotek on Nov. 17, 2014.
International Search Report and Written Opinion in PCT/US2023/035452, mailed Feb. 15, 2024, 11 pages.
Office Action issued in Japanese Patent Application No. 2021-541462, mailed Feb. 13, 2024, 8 pages.
International Search Report and Written Opinion received for PCT Patent Application No. PCT/US2023/077455, mailed on Apr. 8, 2024, 8 pages.
Caccioppoli, et al. "Fabrication of metal powders by ultrasonic atomization", Description of an atomiser based on a new ultrasonic device, Materiaux. vol. 100, Jan. 1, 2002. pp. 1-4.
Chepak-Gizbrekht, et al. "Grain-boundary diffusion modeling in a microstructural material", Computational Materials Science 184 (Nov. 1, 2020): 109896. Abstract, p. 7 col. 2 para 4, Figure 3; Figure 4, 10 pages.
Mao, et al. "The diffusion behaviors at the Cu—Al solid-liquid interface: A molecular dynamics study.", Results in Physics 16 (Mar. 1, 2020): 102998. Abstract, Figure 1; Figure 2, 9 pages.
Zrodowski, et al. "Novel cold crucible ultrasonic atomization powder production method for 3D printing.", Materials 14.10 (May 13, 2021): 2541. Entire Document, 11 pages.
Chen Renzong et al. CN103103405A (machine translation) (Year: 2013).

(56) References Cited

OTHER PUBLICATIONS

Chen, "3D Print and Maker," Huazhong University of Science and Technology Press Co., Ltd., Nov. 30, 2017, p. 7.
International Search Report and Written Opinion in PCT/US2020/012726, mailed Apr. 2, 2020, 7 pages.
International Search Report and Written Opinion in PCT/US2020/012733, mailed Apr. 2, 2020, 9 pages.
International Search Report and Written Opinion in PCT/US2021/064732, mailed Mar. 17, 2022, 9 pages.
International Search Report and Written Opinion received for PCT Patent Application No. PCT/US2023/035452, mailed on Feb. 15, 2024, 11 pages.
Jiang Feng et al. [CN109136670A] (machine translation), (Year: 2019).
Li Ruidi et.al. [CN108330344A] (machine translation). (Year: 2018).
Office Action in CN202080016939.0, mailed Aug. 10, 2022, 17 pages (8 pages of English Translation and 9 pages of Original Document).
Office Action in CN202080018077.5, mailed Mar. 9, 2022, 18 pages (10 pages of English Translation and 8 pages of Original Document).
Office Action in CN202080018077.5, mailed Aug. 10, 2022, 18 pages (10 pages of English Translation and 8 pages of Original Document).
Office Action in JP2021541462, mailed Feb. 13, 2024, 7 pages.
Office Action in RU2021124350, mailed Sep. 26, 2023, 8 pages (official copy only).
Online translation of CN 104561677 A, Apr. 29, 2015, 6 pages.
Zhao Yutao et.al. [WO2018214631A1] (machine translation) (Year: 2018).

* cited by examiner

ALUMINUM ALLOYS

CROSS REFERENCE TO RELATED APPLICATION(S)

This application claims the benefit of U.S. Provisional Application Ser. No. 62/794,509, entitled "HIGH-PERFORMANCE ALUMINUM ALLOY" and filed on Jan. 18, 2019, which is expressly incorporated by reference herein in its entirety.

TECHNICAL FIELD

The present disclosure relates generally to alloys, and more specifically to aluminum alloys.

DESCRIPTION OF THE RELATED TECHNOLOGY

Additive Manufacturing (AM) processes involve the use of a stored geometrical model for accumulating layered materials on a "build plate" to produce three-dimensional (3-D) objects having features defined by the model. AM techniques are capable of printing complex components using a wide variety of materials. A 3-D object is fabricated based on a computer-aided design (CAD) model. The AM process can manufacture a solid three-dimensional object directly from the CAD model without additional tooling.

One example of an AM process is powder bed fusion (PBF), which uses a laser, electron beam, or other source of energy to sinter or melt metallic powder deposited in a powder bed, thereby consolidating powder particles together in targeted areas to produce a 3-D structure having the desired geometry. Different materials or combinations of materials, such as metals, plastics, and ceramics, may be used in PBF to create the 3-D object. Other more advanced AM techniques, including those discussed further below, are also available or under current development, and each may be applicable to the present disclosure.

Another example of an AM process is called Binder Jet (BJ) process that uses a powder bed (similar to PBF) in which metallic powder is spread in layers and bonded by using an organic binder. The resulting part is a green part which requires burning off the binder and sintering to consolidate the layers into full density. The metallic powder material can have the same chemical composition and similar physical characteristics as PBF powders.

Another example of an AM process is called Directed Energy Deposition (DED). DED is an AM technology that uses a laser, electron beam, plasma, or other method of energy supply, such as those in Tungsten Inert Gas (TIG), or Metal Inert Gas (MIG) welding to melt the metallic powder or wire and rod, thereby transforming it into a solid metal object. Unlike many AM technologies, DED is not based on a powder bed. Instead, DED uses a feed nozzle to propel the powder or mechanical feed system to deliver wire and rod into the laser beam, electron beam, plasma beam, or other energy stream. The powdered metal or the wire and rod are then fused by the respective energy beam. While supports or a freeform substrate may in some cases be used to maintain the structure being built, almost all the raw material (powder, wire, or rod) in DED is transformed into solid metal, and consequently, little waste powder is left to recycle. Using a layer by layer strategy, the print head, comprised of the energy beam or stream and the raw material feed system, can scan the substrate to deposit successive layers directly from a CAD model.

PBF, BJ, DED, and other AM processes may use various raw materials such as metallic powders, wires, or rods. The raw material may be made from various metallic materials. Metallic materials may include, for example, aluminum, or alloys of aluminum. It may be advantageous to use alloys of aluminum that have properties that improve functionality within AM processes. For example, particle shape, powder size, packing density, melting point, flowability, stiffness, porosity, surface texture, density electrostatic charge, as well as other physical and chemical properties may impact how well an aluminum alloy performs as a material for AM. Similarly, raw materials for AM processes can be in the form of wire and rod whose chemical composition and physical characteristics may impact the performance of the material. Some alloys may impact one or more of these or other traits that affect the performance of the alloy for AM.

One or more aspects of the present disclosure may be described in the context of the related technology. None of the aspects described herein are to be construed as an admission of prior art, unless explicitly stated herein.

SUMMARY

Several aspects of one or more alloys and compositions of alloys, as well as methods of making and/or using the same, are described herein. For example, one or more alloys or compositions thereof may be aluminum alloys. The one or more alloys may be used in three-dimensional (3-D) printing and/or additive manufacturing to produce additively manufactured structures with the one of more alloys. Illustratively, an alloy may include a composition containing a plurality of materials (e.g., elements, metals, etc.).

According to some configurations of the present disclosure, an alloy may comprise: a composition that includes: magnesium (Mg) that is approximately 5 to 12% by weight of the composition; silicon (Si) that is approximately 0.3 to 3% by weight of the composition; Manganese (Mn) that is approximately 0.1 to 2% by weight of the composition; and aluminum (Al) that is a balance of the composition. In one configuration, the composition may further include at least one of: iron (Fe), chromium (Cr); titanium (Ti); zirconium (Zr); and Yttrium (Y). In one configuration, the composition includes up to approximately 5% by weight of the include Cr. In one configuration, the composition contains up to approximately 0.25% by weight of the Fe. In one configuration, the composition includes at least 0.05% by weight of the Fe. In one configuration, the composition includes at least approximately 1% by weight of the Cr. In one configuration, the composition includes at least approximately 0.1% by weight of the Ti. In one configuration, the composition includes up to 0.6% by weight of the Ti. In one configuration, the composition includes up to approximately 2% by weight of the Zr. In one configuration, the composition includes at least 0.3% by weight of the Zr. In one configuration, the composition includes at least approximately 0.1% by weight of the Y. In one configuration, the composition includes up to 4% by weight of the Y. In one configuration, the composition includes all of the elements listed above (Al, Mg, Mn, Si, Fe, Cr, Ti, Zr, and Y). In one configuration, the balance of the Al of the composition includes up to approximately 0.1% by weight of trace impurities cumulatively and 0.01% individually.

It will be understood that other aspects of alloys will become readily apparent to those skilled in the art from the following detailed description, wherein it is shown and described only several embodiments by way of illustration. As will be realized by those skilled in the art, the manufactured structures and the methods for manufacturing these structures are capable of other and different embodiments, and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of alloys that may be used for additive manufacturing, for example, in automotive, aerospace, and/or other engineering contexts are presented in the detailed description by way of example, and not by way of limitation, in the accompanying drawings, wherein.

DETAILED DESCRIPTION

Figure 1A:
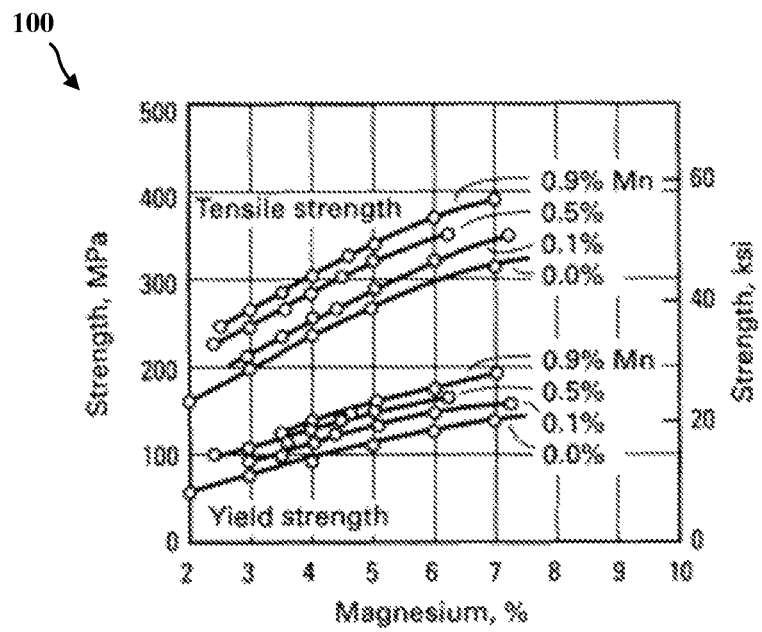
FIGS. 1A-1B are graphs illustrating properties of alloys.

The detailed description set forth below in connection with the appended drawings is intended to provide a description of various exemplary embodiments of aluminum alloys are not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the techniques and approaches of the present disclosure may be practiced without these specific details. In some instances, well-known structures and components may be shown in block diagram form, or omitted entirely, in order to avoid obscuring the various concepts presented throughout this disclosure.

Metal alloys, such as aluminum alloys, are often utilized in various engineering applications, such as automotive and aerospace. In many applications, these engineering applications may benefit from alloys that offer high performance and sustainability. Moreover, alloys that are economical may be more advantageous, e.g., as alloys that include rare and/or expensive elements may be impractical for relatively large-scale and/or commercial applications.

While some alloys that fulfill the aforementioned conditions exist, these existing alloys are mostly unsuitable for additive manufacturing (AM) applications, such as Selective Laser Melting (SLM) and/or Powder Bed Fusion (PBF). For example, AM processes with alloys commonly used for traditional manufacturing (i.e., non-AM manufacturing) may result in microstructure and/or other characteristics of these alloys that are unacceptable—e.g., by resulting in defective and/or unsafe products.

AM processes may include a very small melt pool and/or very high cooling rate from liquid to solid states for alloys, e.g., in comparison with traditional manufacturing processes. Therefore, alloys used in AM processes may be expected to develop microstructure and/or other characteristics (e.g., through the relatively small melt pool and/or relatively high cooling rate) that yield high strength, ductility, fracture toughness, fatigue strength, corrosion resistance, and/or elevated temperature strength and, therefore, result in satisfactory products.

In view of the foregoing, there exists a need for alloys that are high performance and economically feasible for AM in various automotive, aerospace, and/or other engineering applications. The present disclosure describes alloys that may be implemented in AM processes, such as SLM, PBF, DED, and others. In this way, for example, additively manufactured structures of the alloys disclosed in this invention may be produced. The alloys of the present disclosure may provide improved properties for AM in automotive, aerospace, and/or other engineering applications. The alloys may yield improved performance in AM contexts, such as one or more of high strength (e.g., yield strength), ductility, fracture toughness, fatigue strength, corrosion resistance, elevated temperature strength, percent elongation, and/or any combination thereof. Furthermore, application of the alloys of the present disclosure may be economically feasible, for example, in a commercial context and/or production scale for AM in automotive, aerospace, and/or other engineering applications.

In an aspect, high-performance aluminum alloys are described. Crashworthiness is a combination of tensile, shear, and compression strengths that make up a material's crash performance. The analytical and experimental data are utilized by a variety of industries (e.g., automotive) while designing and engineering structures incorporating the materials.

High-performance aluminum alloys processed with conventional techniques (e.g., non-AM processes) may obtain various properties through one or combination of the following processes: solid solution strengthening, strain hardening, precipitation strengthening, and/or dispersion strengthening. The processes of solid solution strengthening, strain hardening, precipitation strengthening, grain or phase boundary strengthening, and/or dispersion strengthening may take place during solidification, subsequent thermal processing, intermediate cold working, or some combination of these.

Solidification processes and subsequent cooling in solid state in AM may differ from those processes occurring through conventional techniques. For example, the solidification in PBF processing occurs on a microscale, layer by layer, with each layer undergoing one or more melting, solidification, and cooling cycles. In such a process, melting may begin at approximately 610° C. and may conclude at approximately 696° C. Due to the small size of the melt pool, the cooling rate is extremely high relative to conventional techniques—e.g., the cooling rate may be from approximately $10^3$° C./second (s) to approximately $10^6$° C./s. Therefore, non-equilibrium thermodynamics and phase transformation kinetics may become the dominate drivers during AM, thereby making alloys exhibit different properties with AM, such as through inheriting element supersaturation and alloy partitioning.

Not all alloys (e.g., AA 4046, etc.) may be suitable for the rapid solidification through AM, which may include relatively small weld pools (and may include a rate of approximately $10^3$° C./s to approximately $10^6$° C./s). The present disclosure describes alloys that may provide high performance with AM, e.g., in comparison to currently available alloys. The performance of these alloys of the present disclosure may be improved in the as-printed state, e.g., after undergoing thermal processing (post AM), or some combination of both in the as-printed state and after undergoing thermal processing.

In one exemplary configuration, one or more alloys of the present disclosure may be tailored for superior strengthening where the one or more alloys would have high ultimate and tensile strength at room and elevated temperature. In another exemplary configuration, one or more of the alloys of the present disclosure may be designed for superior ductility where the one or more alloys would have high elongation at room and elevated temperature.

One or more alloys of the present disclosure may be specifically designed in order to accommodate the rapid melting, solidification, and/or cooling experienced by alloys in AM (e.g., PBF process). For example, the alloying elements and concentrations thereof may be configured such that intermetallics may be formed with other alloying elements during rapid cooling. Further, the alloying elements and concentrations thereof may be configured based on the liquid and/or solid solubilities of the alloying elements in the aluminum matrix. The alloying elements and concentrations thereof may be configured such that the alloying elements may form supersaturated solid solutions and/or nano-precipitates after rapid solidification and cooling during AM (e.g., PBF process). The alloying elements and the concentrations thereof may be configured to form intermetallics and the phases thereof during subsequent thermal processing, for example, including precipitation heat treatment and/or Hot Isostatic Pressing (HIP). Finally, the alloying elements and concentrations thereof may be configured to form targeted specific intermetallics during rapid solidification and cooling such that the phases formed thereby may enhance the performance of the one or more alloys of the present disclosure. Additionally, the configurations of the alloying elements and the concentrations thereof may result in the formation of phases during subsequent thermal processing that improves the mechanical performance of the one or more alloys of the present disclosure.

One or more alloys of the present disclosure are configured with a balance of Al. In some aspects, the balance may include at most 0.1% by weight of trace elements. The Al may be alloyed with a set of other materials, such as one or more elements. Example elements that may be used to form Al alloys in some configurations may include magnesium (Mg), manganese (Mn), silicon (Si), chromium (Cr), titanium (Ti), zirconium (Zr), Yttrium (Y), and/or some combination of all or subset of the foregoing set of elements.

One or more alloys of the present disclosure may be a composition that includes Mg, Mn, Si, and Al. According to various configurations, Mg may be approximately 5% to 12% by weight of the composition, Mn may be approximately 0.1% to 2% by weight of the composition, Si may be approximately 0.3% to 3% by weight of the composition, and Al may be a balance of the composition. According to some further configurations, compositions of the one or more alloys of the present disclosure may include at least one of Fe, Cr, Ti, Zr, and/or Y.

In alloying, various properties may be derived through different elements, e.g., when included in a solid solution with Al. For example, strengthening properties may be derived through Mg and/or Mn when included in a solid solution with Al. However, the addition of Mg and/or Mn may reduce ductility due to intermetallic compound formation based on the solubility of Mg and/or Mn. Table 1 illustrates the solid solution strengthening capabilities of various alloying elements in aluminum alloys. As shown, the greatest solid solution strengthening capabilities may be derived though Mg and Mn, e.g., when measured on the order of thousands of pounds-force per square inch or kilopounds per square inch (ksi).

TABLE 1

| Alloying element | % difference in atomic radius | Strength increase per weight % | |
|---|---|---|---|
| | | Yield (ksi) | Tensile (ksi) |
| Cu | −10.70 | 2.00 | 6.25 |
| Mn | −11.30 | 4.40 | 7.80 |
| Si | −3.80 | 1.33 | 5.75 |
| Mg | +11.8 | 2.70 | 7.30 |
| Zn | −6.00 | 0.42 | 2.20 |

Some existing Al alloys (e.g., Al alloys of in the 3000 and 5000 series) produced through conventional processing are based on the addition of Mg and Mn in Al. The Mn content in Al alloys of the 3000 series may be between 0.2% and 1.2%, and the Mg content in Al alloys of the 5000 series may be between 0.5% and 5.51%. As another existing alloy, aluminum alloy (AA) 6061 may have high strength and ductility, e.g., for applications in aerospace engineering. However, AA 6061 may be unsuitable for AM applications. In particular, PBF processes using AA 6061 may produce undesirable results.

As described herein, AM may be associated with relatively high-temperature melting and relatively fast cooling, e.g., in comparison with conventional or non-AM processing techniques. The fast cooling rate associated with AM may increase the solubility limits of various elements included in one or more alloys described herein, thereby resulting in microstructures that are relatively finer in comparison with those of conventional or non-AM processing techniques.

As described above, one or more alloys of the present disclosure may include, in addition to Al, Mg that is inclusively between 5% and 12% by weight of the alloy, which may be alloyed in conjunction with Mn to derive a relative high strength and/or ductility (e.g., in comparison with Al alloys of in the 3000 and 5000 series). For example, one or more alloys of the present disclosure may include Mg that is at least 7% by weight of the alloy.

Figure 1B:
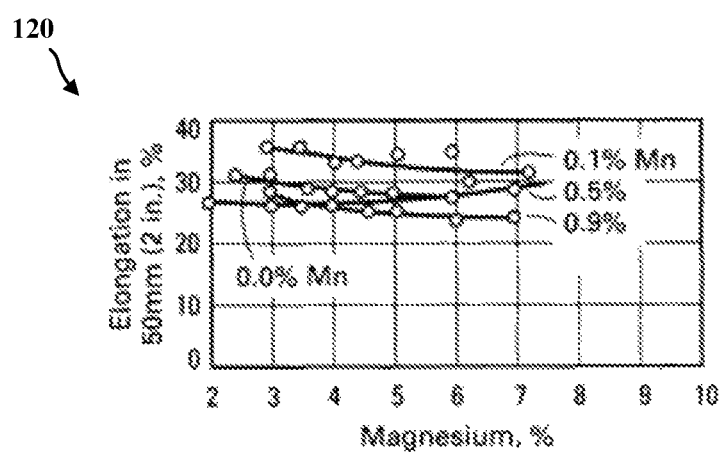

FIGS. 1A and 1B illustrate two graphs 100, 120 of properties of Al alloyed with Mg and Mn. Referring to FIG. 1A, the first graph 100 shows both the yield strength (in megapascals (MPa)) and the tensile strength (in ksi) of Al alloyed with percentages by weight of Mg and Mn. As illustrated, both the yield strength and the tensile strength of Al alloys increase for at least the percentages by weight between approximately 2% Mg and exceeding 7% Mg, which may be alloyed in combination with percentages by weight between approximately 0.0% Mn and 0.9% Mn.

Referring to FIG. 1B, the second graph 120 shows the percent elongation (in 50 millimeters (mm)/≈2 inches (in)) of Al alloyed with percentages by weight of Mg and Mn. As illustrated, the percent elongation of Al alloys may remain relatively high (e.g., greater than 20%, but may be less than 40%) for at least the percentages by weight between approximately 2% Mg and exceeding 7% Mg, which may be alloyed in combination with percentages by weight between approximately 0.0% Mn and 0.9% Mn. Thus, as shown in FIGS. 1A and 1B, Al may be alloyed with approximately 7% by weight of Mg (e.g., potentially less than and/or potentially greater than 7% by weight of Mg) and in order to configure one or more alloys of the present disclosure with relatively high strength and ductility. As shown in Table 2, an exemplary configuration of an alloy having high strength and high ductility is illustrated.

TABLE 2

| Alloy | Mg (weight %) | Mn (weight %) | Al |
|---|---|---|---|
| Al—Mg—Mn | 5.2-11.5 | 0.2-1.2 | Balance |

While Al alloyed with Mg and/or Mn may provide relatively high strength and/or high ductility, the relatively high strength may be derived through solid solution strengthening, but such alloys may not be heat treatable. Thus, one or more alloys of the present disclosure may be configured for solid solution strengthening and, additionally, for precipitation hardening. In so doing, the one or more alloys of the present disclosure may be suitable for AM applications, including 3-D printing. For example, one or more alloys of the present disclosure may be configured with one or more other elements, in addition to Mg and Mn with a balance of Al. With the addition of the one or more other elements, the one or more alloys described herein may be suitable for AM applications, such as 3-D printing, while still providing relatively high strength, ductility, and/or durability.

Configuring one or more alloys of the present disclosure with Si may contribute to precipitation hardening of the one or more alloys. For example, Si may be included in an Al—Mg—Mn alloy. A configuration with Si may contribute to precipitation hardening. By way of illustration, Table 3 shows various examples of an Al—Mg—Mn—Si alloy that may be suitable for AM. According to some configurations, one or more of the alloys shown in Table 3 may be alloyed with one or more other elements, e.g., as described herein.

TABLE 3

| Alloy | Mg (weight %) | Mn (weight %) | Si (weight %) | Al |
|---|---|---|---|---|
| Al—Mg—Mn—Si 1 | 5.0-7.0 | 0.8-1.2 | 0.8-1.2 | Balance |
| Al—Mg—Mn—Si 2 | 6.0-8.0 | 1.0-1.1 | 1.0-1.2 | Balance |
| Al—Mg—Mn—Si 3 | 8.0-10.0 | 0.2-0.5 | 0.8-1.2 | Balance |
| Al—Mg—Mn—Si 4 | 8.0-10.0 | 0.2-0.5 | 1.4-2.0 | Balance |
| Al—Mg—Mn—Si 5 | 7.0-9.0 | 0.4-0.8 | 1.4-2.0 | Balance |
| Al—Mg—Mn—Si 6 | 6.0-8.0 | 0.9-1.1 | 0.8-1.2 | Balance |

According to various configurations, one or more alloys of the present disclosure may include a set of primary elements: Al, Mg, Mn, and Si. Table 4 illustrates ranges for percentages of weights of the one or more primary elements with which one or more alloys of the present disclosure may be configured.

TABLE 4

| Al | Mg | Mn | Si |
|---|---|---|---|
| Balance | 5-12% | 0.1-2% | 0.3-3% |

As an addition or alternative to Si, one or more alloys of the present disclosure may be configured with one or more of a set of secondary elements: Fe, Ti, Zr, Cr, and/or Y. Table 5 illustrates ranges of percentages of weights of the one or more secondary elements with which one or more alloys of the present disclosure may be configured. One or more alloys of the present disclosure may be configured with all, none, or a subset of the set of secondary elements.

TABLE 5

| Fe | Ti | Zr | Cr | Y |
|---|---|---|---|---|
| 0.05-0.25% | 0.1-0.6% | 0.3-2.0% | 1-5% | 0.1-4% |

According to a first example, one configuration of the composition may include the balance of Al, the aforementioned percentages by weight of Mg, Mn, and Si, and may further include up to approximately 0.25% by weight of the Fe. In another configuration, the composition of the first example may include at least approximately 0.05% by weight of the Fe.

Iron is the most common impurity found in aluminum. Iron has a high solubility in molten aluminum, and is therefore easily dissolved at all molten stages of production. The solubility of iron in the solid state is very low and, depending on the cooling rate, it can precipitate by forming $FeAl_3$, and more complex AlFeMgSi, in the alloy to provide additional strength if controlled in the disclosed level in the composition.

According to a second example, one configuration of the composition may include the balance of Al, the aforementioned percentages by weight of Mg, Mn, and Si, and may further include up to approximately 0.6% by weight of the Ti. In another configuration, the composition of the second example may include at least approximately 0.1% by weight of the Ti. Titanium can be used primarily as a grain refiner of aluminum alloys. When used alone, the effect of titanium decreases with time of holding in the molten state and with repeated re-melting. However, titanium depresses electrical conductivity and, therefore, can be used with chromium, which has a large effect on the resistivity of aluminum alloys.

According to a third example, one configuration of the composition may include the balance of Al, the aforementioned percentages by weight of Mg, Mn, and Si, and may further include up to approximately 2.0% by weight of the Zr. In another configuration, the composition of the third example may include at least approximately 0.3% by weight of the Zr.

According to a fourth example, one configuration of the composition may include the balance of Al, the aforementioned percentages by weight of Mg, Mn, and Si, and may further include up to approximately 5% by weight of the Cr. In another configuration, the composition of the fourth example may include at least approximately 1% by weight of the Cr. Chromium increases the elastic modulus in solid solution and increases the strength of the composition when in the form of submicron precipitates. Because chromium has a slow diffusion rate, the chromium may form extremely fine dispersed phases in the composition, and may be retained in the solid solution of the composition to increase both elastic modulus and strength. Chromium also reduces stress corrosion susceptibility and improves toughness.

According to a fifth example, one configuration of the composition may include the balance of Al, the aforementioned percentages by weight of Mg, Mn, and Si, and may further include up to approximately 4% by weight of the Y. In another configuration, the composition of the fifth example may include at least approximately 0.1% by weight of the Y.

Referring to zirconium and yttrium, both elements may form complex but nano precipitates when available in small quantities. However, the present disclosure describes relatively higher amounts of both zirconium and yttrium, which may increase solid solution strength and toughness of the alloy, thereby reducing the susceptibility to cracking at high cooling rates. Yttrium may be more effective than zirconium (e.g., in increasing solid solution strengthening and/or toughness), and the inclusion of one or both of two elements in the amounts disclosure herein may balance their effects with their costs (e.g., in production of one or more of the alloys of the present disclosure).

In some exemplary applications, the one or more alloys of the present disclosure may be used for AM in automotive engineering. For example, the one or more alloys described herein may be additively manufactured for the production of nodes, joints, and/or other structures, which may be applied in vehicles (e.g., cars, trucks, etc.). For example, the one or more alloys described herein may be additively manufactured to produce all or a portion of a chassis, frame, body, etc. of a vehicle.

The characteristics of the one or more alloys described herein may contribute to the crashworthiness of structures produced from the one or more alloys described herein. Moreover, the one or more alloys of the present disclosure may be configured with the materials (e.g., elements) described herein so that products additively manufactured using at least a portion of the one or more alloys may reduce the weight of vehicles at a suitable insertion point (e.g., in comparison with existing approaches to vehicle manufacture).

The one or more alloys of the present disclosure may feature characteristics and/or properties that exceed the corresponding characteristics and/or properties of various existing alloys, e.g., in the context of AM applications. For example, Table 6 shows exemplary compositions of alloys described in the present disclosure, with the illustrated values of the enumerated elements being the percentage by weight of each corresponding element. The values include mechanical properties of the as-printed parts, without any subsequent machining or post-processing operations. The alloys of Tables 4-6 may include resultant mechanical properties that exceed those of conventional wrought AA 6061-T6. For example, the yield strength of an alloy illustrated in Table 6 may be 266 MPa, the tensile strength of an alloy illustrated in Table 6 may be 391 MPa, and the percent elongation of the alloy illustrated in Table 6 may be 11.3%.

TABLE 6

| Aluminum alloys | Composition, weight % | | | | | Strength, MPa | | Elongation % |
| --- | --- | --- | --- | --- | --- | --- | --- | --- |
| | Mg | Si | Mn | Fe | Al | Yield | Tensile | |
| Alloy 1 | 5.64 | 1.21 | 1.02 | 0.16 | Balance | 251 | 385 | 11.3 |
| Alloy 2 | 5.29 | 1.23 | 0.9 | 0.1 | Balance | 235 | 370 | 10.1 |
| Alloy 3 | 6.19 | 1.07 | 1.1 | 0.06 | Balance | 266 | 391 | 9.5 |
| Alloy 4 | 7.13 | 1.09 | 0.57 | 0.15 | Balance | 262 | 403 | 9 |

AM processes may use various metallic powders, such as one or more alloys of the present disclosure. FIGS. 2A-2D illustrate respective side views of an exemplary 3-D printer system. In this example, the 3-D printer system is a powder-bed fusion (PBF) system 200. FIGS. 2A-2D show PBF system 200 during different stages of operation. It should also be noted that features of FIGS. 2A-2D and the other figures in this disclosure are not necessarily drawn to scale, but may be drawn larger or smaller for the purpose of better illustration of concepts described herein.

The particular embodiments illustrated in FIGS. 2A-D are some suitable examples of a PBF system employing principles of the present disclosure. Specifically, one or more of the aluminum alloys described herein may be used in at least one PBF system 200 described in FIGS. 2A-D. While one or more aluminum alloys described in the present disclosure may be suitable for various AM processes (e.g., using a PBF system, as shown in FIGS. 2A-D), it will be appreciated that one or more aluminum alloys of the present disclosure may be suitable for other applications, as well. For example, one or more aluminum alloys described herein may be used in other fields or areas of manufacture without departing from the scope of the present disclosure. Accordingly, AM processes employing the one or more aluminum alloys of the present disclosure are to be regarded as illustrative, and are not intended to limit the scope of the present disclosure.

According to some examples of the present disclosure, an aluminum alloy used in PBF system 200 may be a composition that includes a balance of Al, Mg that is at least 2% by weight of the composition, Mn that is up to 2.5% by weight of the composition, and Si that is up to 4% by weight of the composition. In a specific configuration, Mg may be 5 to 12% by weight of the composition, Mn may be 0.1 to 2% by weight of the composition, and Si may be 0.3 to 3% by weight of the composition.

In some further configurations, the composition may further include at least one element selected from a group of Fe, Ti, Zr, Cr, and/or Y. In one example, the composition may include Fe that is up to 1% by weight of the composition—e.g., the composition may include Fe that is inclusively between 0.05% to 0.25% by weight of the composition. In another example, the composition may include Ti that is 0 to 1% by weight of the composition—e.g., the composition may include Ti that is inclusively between 0.1% to 0.6% by weight of the composition. In a further example, the composition may include Zr that is 0.15-5% by weight of the composition—e.g., the composition may include Zr that is inclusively between 0.3% to 2% by weight of the composition. In still another example, the composition may include Cr that is at least 1% by weight of the composition—e.g., the composition may include Cr that is inclusively between 1% to 5% by weight of the composition. In yet another example, the composition may include Y that is at least 0.1% by weight of the composition—e.g., the composition may include Y that is inclusively between 0.1% to 4% by weight of the composition. In one configuration, the composition includes all of the elements listed above (Al, Mg, Mn, Si, Fe, Cr, Ti, Zr, and Y). In one configuration, the composition includes up to approximately 0.1% by weight of trace impurities cumulatively, and 0.01% individually (e.g., in each individual element that is alloyed with the balance of Al).

Prior to use in PBF system 200, the elements of an aluminum alloy may be combined into a composition according to one of the examples/configurations described herein. For example, the elements in respective concentrations described in one of the examples/configurations of the present disclosure may be combined when the elements are molten. The composition may be mixed while the elements are molten, e.g., in order to promote even distribution of each element with the balance of Al. The molten composition may be cooled and atomized. Atomization of the composition may yield a metallic powder that includes the elements of the one of the examples/configurations of the present disclosure, and can be used in additive manufacturing systems such as PBF system 200.

PBF system 200 can include a depositor 201 that can deposit each layer of metal powder, an energy beam source 203 that can generate an energy beam, a deflector 205 that can apply the energy beam to fuse the powder material, and a build plate 207 that can support one or more build pieces, such as a build piece 209. PBF system 200 can also include a build floor 211 positioned within a powder bed receptacle. The walls 212 of the powder bed receptacle generally define the boundaries of the powder bed receptacle, which is sandwiched between the walls 212 from the side and abuts a portion of the build floor 211 below. Build floor 211 can progressively lower build plate 207 so that depositor 201 can deposit a next layer. The entire mechanism may reside in a chamber 213 that can enclose the other components, thereby protecting the equipment, enabling atmospheric and temperature regulation and mitigating contamination risks. Depositor 201 can include a hopper 215 that includes a powder 217, such as a metal powder, and a leveler 219 that can level the top of each layer of deposited powder.

Figure 2A:
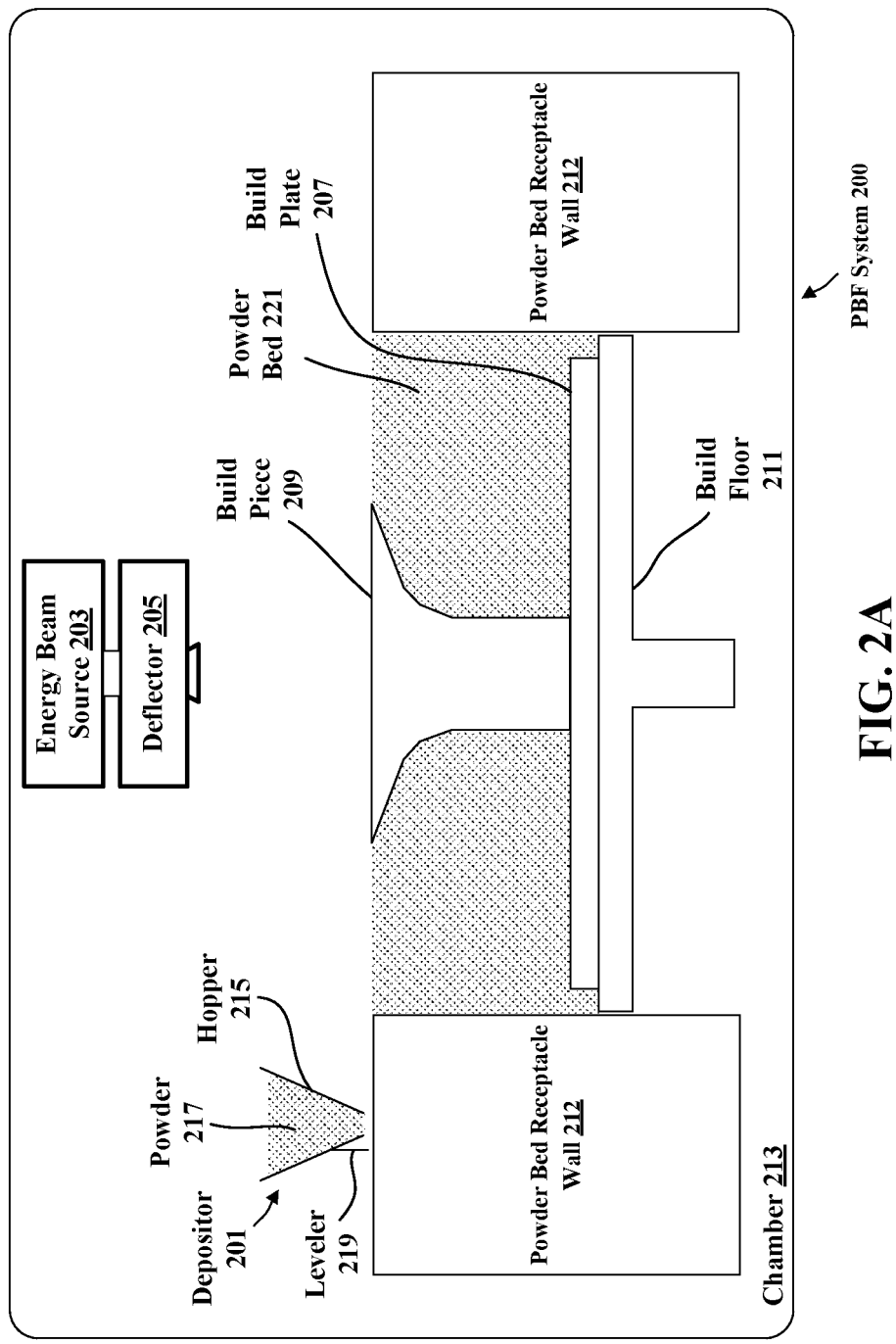
FIGS. 2A-2D illustrate respective side views of an exemplary 3-D printer system.

Referring specifically to FIG. 2A, this figure shows PBF system 200 after a slice of build piece 209 has been fused, but before the next layer of powder has been deposited. In fact, FIG. 2A illustrates a time at which PBF system 200 has already deposited and fused slices in multiple layers, e.g., 150 layers, to form the current state of build piece 209, e.g., formed of 150 slices. The multiple layers already deposited have created a powder bed 221, which includes powder that was deposited but not fused.

Figure 2B:
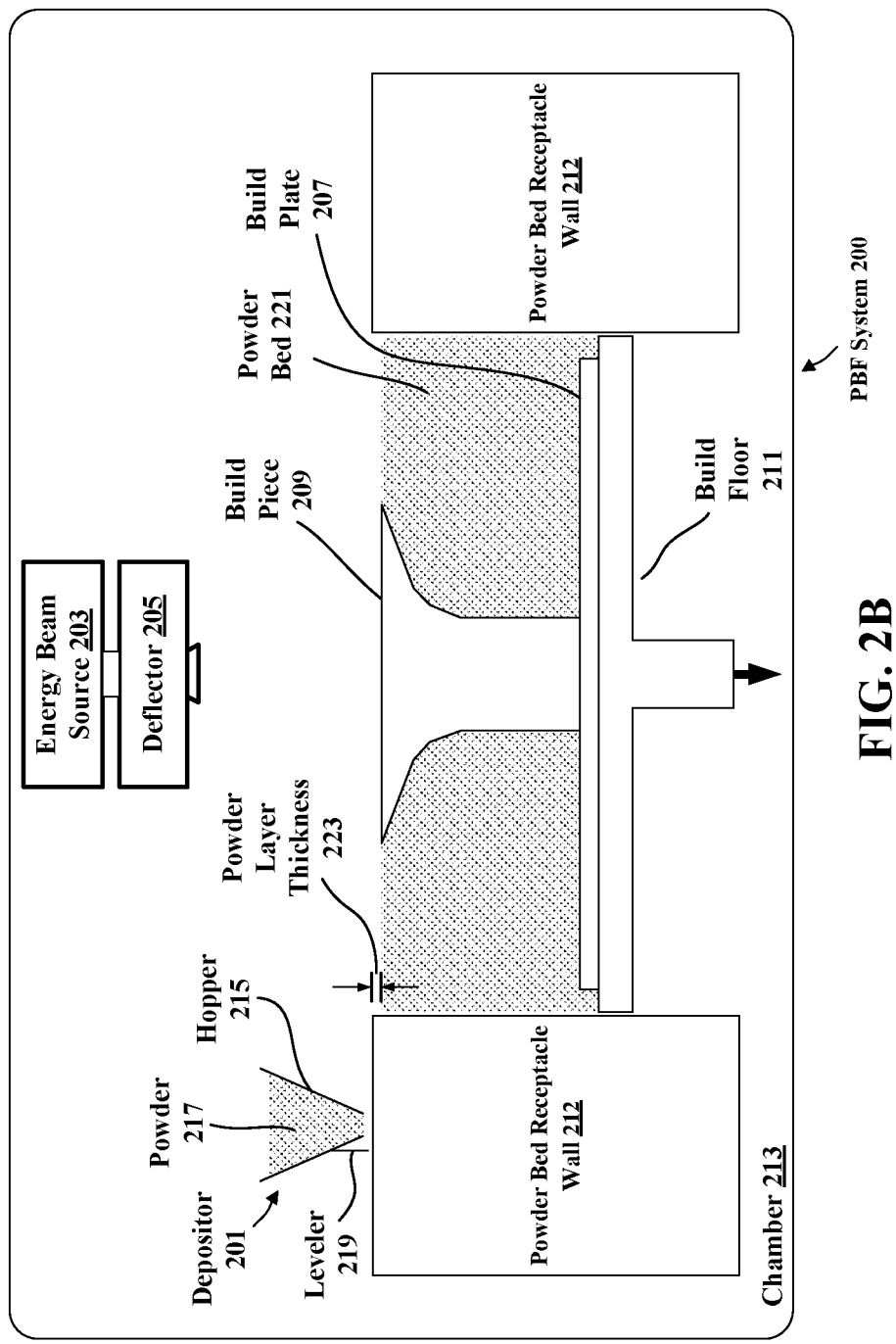

FIG. 2B shows PBF system 200 at a stage in which build floor 211 can lower by a powder layer thickness 223. The lowering of build floor 211 causes build piece 209 and powder bed 221 to drop by powder layer thickness 223, so that the top of the build piece and powder bed are lower than the top of powder bed receptacle wall 212 by an amount equal to the powder layer thickness. In this way, for example, a space with a consistent thickness equal to powder layer thickness 223 can be created over the tops of build piece 209 and powder bed 221.

Figure 2C:
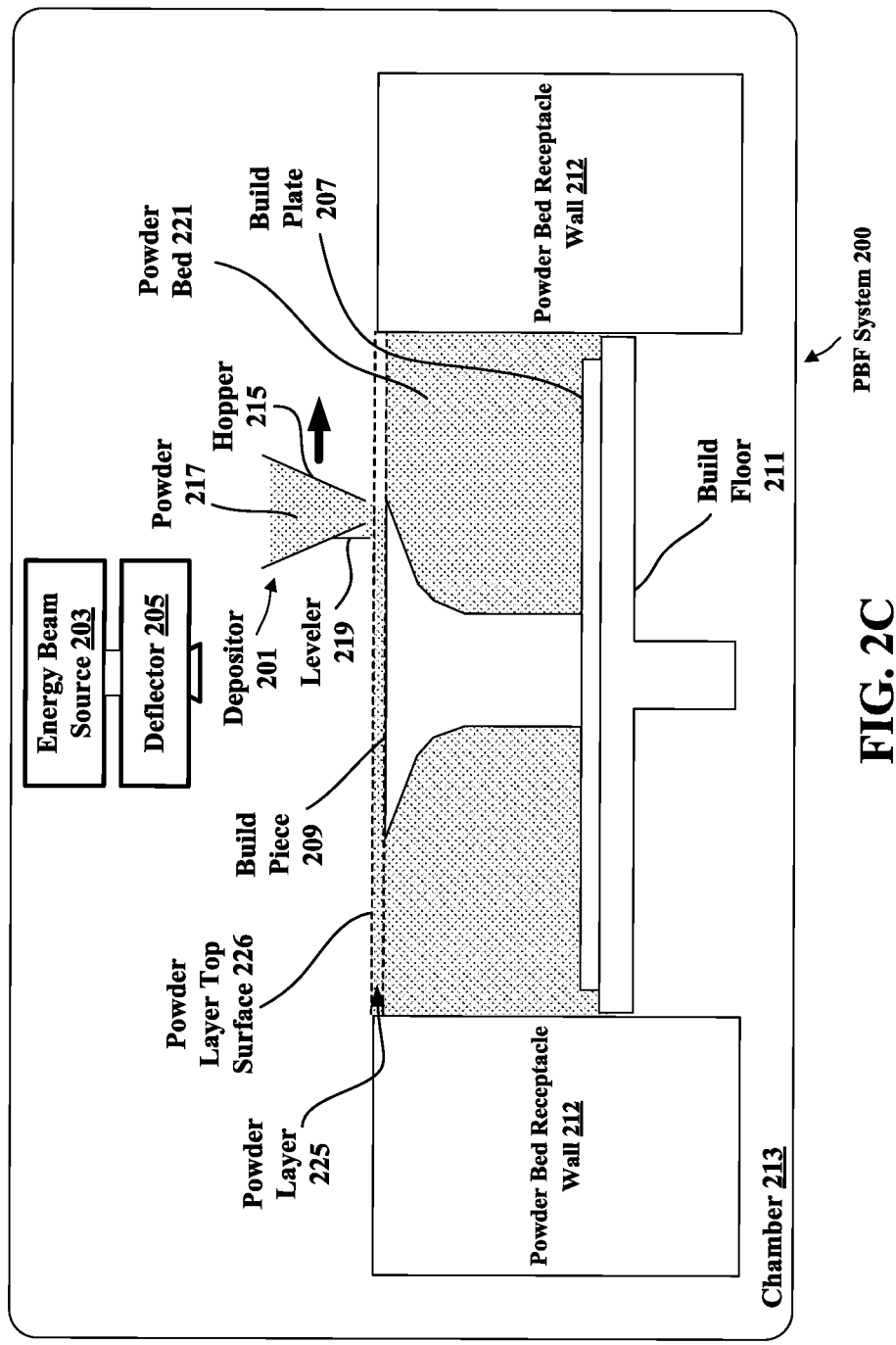

FIG. 2C shows PBF system 200 at a stage in which depositor 201 is positioned to deposit the powder 217 in a space created over the top surfaces 226 of build piece 209 and powder bed 221 and bounded by powder bed receptacle walls 212. In this example, depositor 201 progressively moves over the defined space while releasing the powder 217 from hopper 215. Leveler 219 can level the released powder to form a powder layer 225 that has a thickness substantially equal to the powder layer thickness 223 (see, e.g., FIG. 2B). Thus, the powder in a PBF system can be supported by a powder material support structure, which can include, for example, a build plate 207, a build floor 211, a build piece 209, walls 212, and the like. It should be noted that the illustrated thickness of powder layer 225 (i.e., powder layer thickness 223 (FIG. 2B) is greater than an actual thickness used for the example involving 150 previously-deposited layers discussed above with reference to FIG. 2A.

Figure 2D:
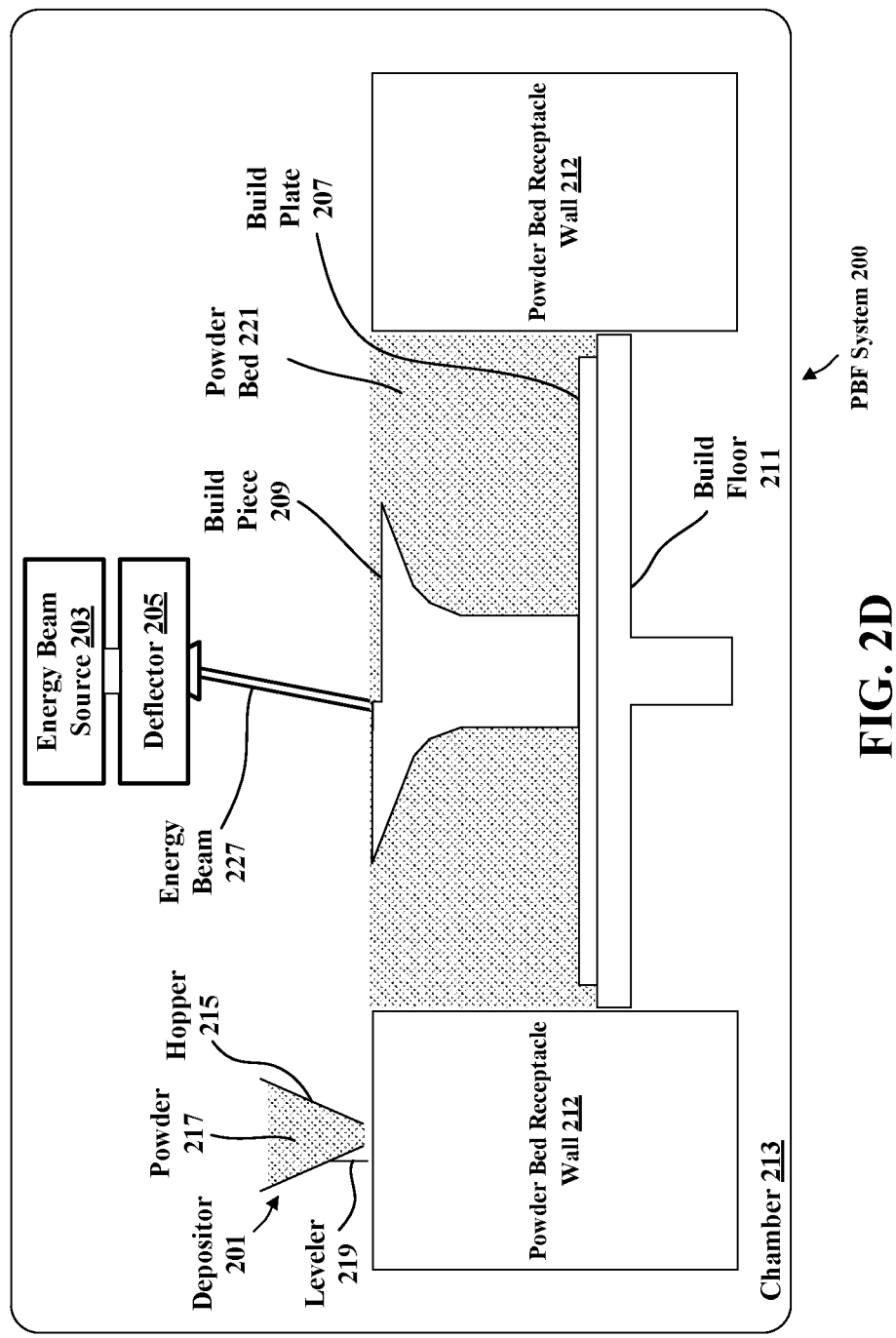

FIG. 2D shows PBF system 200 at a stage in which, following the deposition of powder layer 225 (FIG. 2C), energy beam source 203 generates an energy beam 227 and deflector 205 applies the energy beam to fuse the next slice in build piece 209. In various exemplary embodiments, energy beam source 203 can be an electron beam source, in which case, energy beam 227 constitutes an electron beam. Deflector 205 can include deflection plates that can generate an electric field or a magnetic field that selectively deflects the electron beam to cause the electron beam to scan across areas designated to be fused. In various embodiments, energy beam source 203 can be a laser, in which case, the energy beam 227 is a laser beam. Deflector 205 can include an optical system that uses reflection and/or refraction to manipulate the laser beam to scan selected areas to be fused.

In various embodiments, the deflector 205 can include one or more gimbals and actuators that can rotate and/or translate the energy beam source to position the energy beam. In various embodiments, energy beam source 203 and/or deflector 205 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

An alloy may be a substance composed of two or more materials (e.g., metals or nonmetals). The two or more materials may be combined together by being merged together, for example, when molten.

In some configurations, one or more alloys of the present disclosure may be a composition that may be mixed to include a balance of Al and the following materials: (1) Mg that is approximately 5-12% by weight of the composition; (2) Mn that is approximately 0.1-2% by weight of the composition; (3) Si that is 0.3-3% by weight of the composition. In some configurations, the balance of Al may include up to 0.1% of trace elements.

In some other configurations, one or more alloys of the present disclosure may be the aforementioned composition of Al, Mg, Mn, and Si, and the composition may include at least one of the following other materials: Fe, Ti, Zr, Cr, and/or Y. When an alloy of the present disclosure is a composition that includes Fe, Fe may be 0.05-0.25% by weight of the composition. When an alloy of the present disclosure is a composition that includes Ti, Ti may be 0.1-0.6% by weight of the composition. When an alloy of the present disclosure is a composition that includes Zr, Zr may be 0.3-2% by weight of the composition. When an alloy of the present disclosure is a composition that includes Cr, Cr may be 1-5% by weight of the composition. When an alloy of the present disclosure is a composition that includes Y, Y may be 0.1-4% by weight of the composition. In various configurations, the one or more alloys of the present disclosure may include all, none, or some of the other materials Fe, Ti, Zr, Cr, and/or Y.

An example alloy of the present disclosure may be processed with the L-PBF method to print test bars. Tensile properties may be obtained from the example alloy.

AM raw materials can be manufactured by powder making processes as well as other methods such as Ingot Metallurgy (I/M) in which a solid ingot is manufactured by melting the metal along with added alloying elements and solidifying in a mold such as ingot. The molded solid or the ingot is then deformed by various wrought material production methods such as rolling, extrusion, drawing etc. The ingots, wires and rods are either melted and atomized to make powders or fed directly into the laser, electron, plasma beams, or electrical arc such as TIG, MIG, to melt the metal layer by layer manufacture AM products.

Powder characteristics may be important for successful fusion within an AM machine such as PBF and/or DED. Some aspects of alloy powders that may be advantageous for use with AM may include but are not limited to, good flow, close packing of particles and spherical particle shape. These aspects may lead to consistent and predictable layers.

The previous description is provided to enable any person skilled in the art to practice the various aspects described herein. Various modifications to these exemplary embodiments presented throughout this disclosure will be readily apparent to those skilled in the art, and the concepts disclosed herein may be applied to aluminum alloys. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An alloy comprising:
a composition that includes:
magnesium (Mg) that is 2% to 12% by weight of the composition;
manganese (Mn) that is between 0.2% and 2.5% by weight of the composition;
zirconium (Zr) that is
between 0.5% and 2% by weight of the composition, or
between 2.5% and 5% by weight of the composition; and
aluminum (Al).

2. The alloy of claim 1, wherein the composition includes: the Mg that is 2% to 4% by weight of the composition.

3. The alloy of claim 1, wherein the composition includes: the Mn that is 0.3% or greater by weight of the composition.

4. The alloy of claim 1, wherein the composition includes: the Zr that is between 0.6% and 2% by weight of the composition.

5. The alloy of claim 1, wherein the composition further includes:
Fe that is up to 1% by weight of the composition.

6. The alloy of claim 5, wherein the composition includes up to 0.25% by weight of the Fe.

7. The alloy of claim 6, wherein the composition includes at least 0.05% by weight of the Fe.

8. The alloy of claim 1, wherein the composition further includes up to 0.6% by weight of Ti.

9. The alloy of claim 8, wherein the composition includes at least 0.1% by weight of the Ti.

10. The alloy of claim 1, wherein the composition includes up to 1.9% by weight of the Zr.

11. The alloy of claim 10, wherein the composition includes at least 0.6% by weight of the Zr.

12. The alloy of claim 1, wherein the composition further includes up to 5% by weight of Cr.

13. The alloy of claim 12, wherein the composition includes at least 1% by weight of the Cr.

14. The alloy of claim 1, wherein the composition further includes up to 4% by weight of Y.

15. The alloy of claim 14, wherein the composition includes at least 0.1% by weight of the Y.

16. The alloy of claim 1, wherein elongation of the composition as-printed is at least 8%.

17. The alloy of claim 1, wherein elongation of the composition as-printed is at least 10%.

18. The alloy of claim 1, wherein elongation of the composition as-printed is at least 11.3%.

19. The alloy of claim 1, wherein the composition further includes:
Fe that is up to 0.5% by weight of the composition.

20. The alloy of claim 1, wherein the composition includes greater than or equal to 6% by weight of the Mg.

21. The alloy of claim 1, wherein the composition includes less than or equal to 6% by weight of the Mg.

22. The alloy of claim 1, wherein the composition includes greater than or equal to 1.5% by weight of the Mn.

23. The alloy of claim 1, wherein the composition includes greater than or equal to 0.6% by weight of the Zr.

24. The alloy of claim 1, wherein the composition includes greater than or equal to 0.8% by weight of the Zr.

25. The alloy of claim 1, wherein the composition includes greater than or equal to 1.0% by weight of the Zr.

26. The alloy of claim 1, wherein the composition includes greater than or equal to 2.6% by weight of the Zr.

27. The alloy of claim 1, wherein the composition includes greater than or equal to 2.7% by weight of the Zr.

28. The alloy of claim 1, wherein the composition includes greater than or equal to 2.8% by weight of the Zr.

29. The alloy of claim 1, wherein the composition includes greater than or equal to 2.9% by weight of the Zr.

30. The alloy of claim 1, wherein the composition further includes:
Cr that is up to 1% by weight of the composition.

31. The alloy of claim 30, wherein the composition includes at least 0.1% by weight of the Cr.

32. The alloy of claim 1, wherein the composition further includes:
Cr that is 3%-5% by weight of the composition.

33. The alloy of claim 1, wherein the composition includes the Zr between 0.5% and 1.9% by weight of the composition, or
between 2.6% and 5% by weight of the composition.

34. The alloy of claim 1, wherein the composition includes the Zr between 0.5% and 1.8% by weight of the composition, or
between 2.7% and 5% by weight of the composition.

35. The alloy of claim 1, wherein the composition includes the Zr between 0.5% and 2% by weight of the composition.

36. The alloy of claim 1, wherein the composition includes the Zr between 2.5% and 5% by weight of the composition.

37. The alloy of claim 1, wherein the composition includes the Zr between 0.5% and 1.8% by weight of the composition.

38. The alloy of claim 1, wherein the composition includes the Zr between 2.7% and 5% by weight of the composition.

39. The alloy of claim 1, wherein the composition includes the Mn greater than 0.4% by weight of the composition.

* * * * *